May 20, 1930.     A. M. BERG     1,758,922
AUTOMATIC CUT-OFF MECHANISM FOR ELECTRIC STILLS
Filed April 24, 1929     2 Sheets-Sheet 1

Inventor:
Alexander M. Berg.
By Rector, Hibben, Davis & Macauley
Attys

May 20, 1930. A. M. BERG 1,758,922
AUTOMATIC CUT-OFF MECHANISM FOR ELECTRIC STILLS
Filed April 24, 1929 2 Sheets-Sheet 2
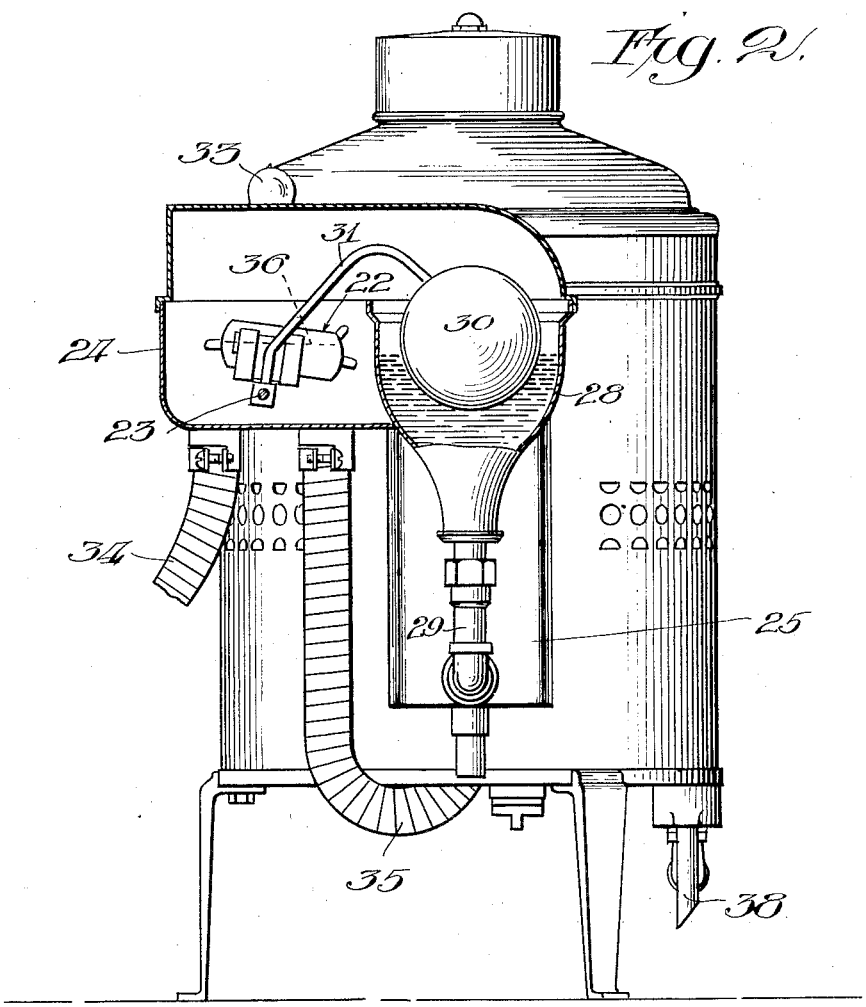
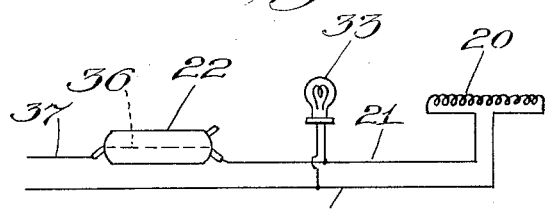
Inventor
Alexander M. Berg.
By Rector, Hibben, Davis & Macauley
Attys Patented May 20, 1930

1,758,922

UNITED STATES PATENT OFFICE

ALEXANDER M. BERG, OF CHICAGO, ILLINOIS, ASSIGNOR TO PRECISION SCIENTIFIC COMPANY, OF CHICAGO, ILLINOIS, A CORPORATION OF ILLINOIS

AUTOMATIC CUT-OFF MECHANISM FOR ELECTRIC STILLS

Application filed April 24, 1929. Serial No. 357,620.

My invention relates to automatic cut-off mechanisms for electric stills. The principal object of my invention is to devise a safety cut-off mechanism for use in connection with electrically operated distillation apparatus which shall be characterized by an entirely automatic mode of functioning, with a resulting avoidance of any necessity for close attention to the stills during operation. A further object is the provision of a cut-off mechanism of the general type described which, in addition to interrupting the current flow to the heating element of the still when the water supply becomes insufficient, also includes a warning signal that operates to give notice of a stoppage of the still. Other objects of the invention will become more apparent in the following specification, reference being had to the accompanying drawing, and a novel means by which said objects are effectuated will be definitely pointed out in the claim.

Fig. 2 is view, partly in section, looking in the direction of the arrows shown in Fig. 1.

Fig. 3 is a diagram of the electrical connection utilized in connection with my improved mechanism.

Figure 1:
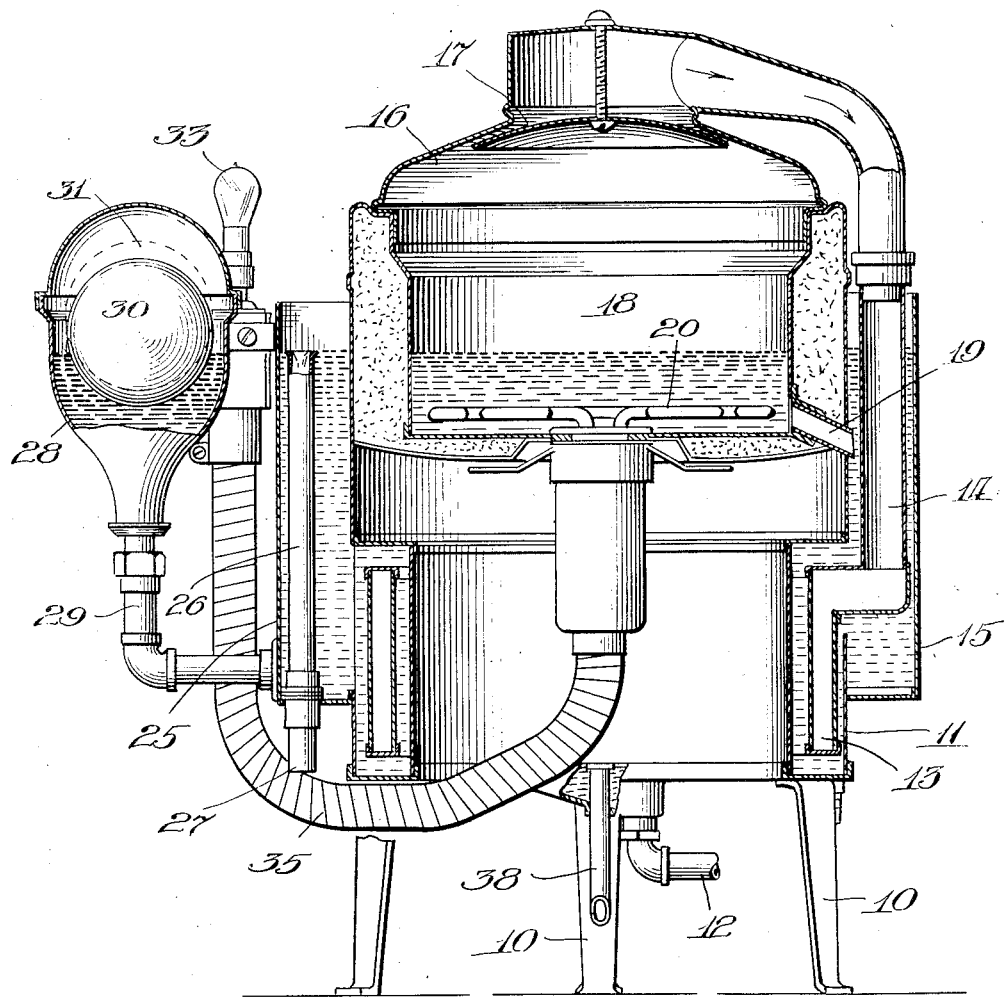
Figure 1 is a sectional elevation of a preferred form of electric still, showing my improved cut-off mechanism attached thereto.

The numeral 10 designates a plurality of supporting legs which carry the water casing 11 having any desired form of inlet or supply connection 12. Positioned within said casing is a condensing chamber 13 which communicates with a vapor tube 14 positioned within a second water chamber 15 which is attached externally to the casing 11, communicating therewith and extending upwardly therefrom. The tube 14 extends upwardly beyond the chamber 15 and communicates with a steam dome 16 having a separating baffle 17 positioned adjacent the outlet thereof. The dome 16 is carried over a retort chamber 18 which communicates with the water chamber 15 by means of a passage 19.

A heating element 20 is disposed adjacent the bottom of the chamber 18 and is electrically connected by means of a lead 21 with one terminal of a mercury switch 22 that is pivotally mounted on a pintle 23 carried in a casing 24, said casing being supported by a water chamber 25 which is generally similar to the chamber 15, but disposed on the opposite side of the casing 11 therefrom. The chamber 25 communicates with the casing 11 and has positioned therein an overflow tube 26 which projects through the bottom of the casing to form a drain 27. Formed with the casing 24 is a float chamber 28 which communicates with the water chamber 25 by means of a pipe 29 and a float 30 is mounted to operate in the chamber 28, being connected to the switch 22 by means of an arm 31. Hence, it will be obvious that fluctuation of the water level in the float chamber 28 will cause movement of the ball 30 and effect a tilting of the switch 22 with corresponding changes in the level position of the mercury contained in said switch. A lead 32 connects the electric heating element 20 to any desired source of electrical energy and a similar lead 37 connects the switch 22 with said source. The leads 21, 32 and 37 may be encased in flexible cables 34 and 35 which are carried in any appropriate manner on the still.

In operation, water will be supplied to the casing 11 through the supply inlet 12, rising upwardly in said chamber to flow into the chambers 15 and 25 and into the retort chamber 18 through the passage 19 until it reaches some level such as is indicated generally in Fig. 1, the overflow tube 26 being utilized for the purpose of maintaining a constant level in the retort 18. The steam which is created by the boiling of the water in the retort chamber 18 rises upwardly into the dome 16 and passes downwardly through the vapor tube 14 where it is condensed and is received within the condensing chamber 13, finally being delivered to an outlet 38. The rate of flow of inlet water is proportional to the amount of distilling as well as condensing steam for any temperature desired, that is, the higher the rate of flow through the condensing chamber, the cooler the condensate will flow from the outlet 38. The construction and operation of the still described in this application in and of itself forms no part of my invention, but has been described in detail as exemplifying a preferred form of operating environment with which my improved cut-off mechanism may be employed.

Changes in the water level within the still proper will be reflected in the float chamber 28 through the pipe 29 and will therefore cause a rising and a falling movement of the ball 30. If it should happen that the depth of the water in the retort chamber 18 above the heating element 20 should fall below a point that would endanger the still and possibly cause a burning out of said element, the ball 30 will move downwardly within the chamber 28, thus moving the mercury switch 22 into such a position that the mercury 36 thereof will no longer afford a means of electrical connection between the terminals of said switch, this functional characteristic of the mercury switch being well known and of itself forming no part of my invention. When the mercury switch has been moved to the position just indicated, current flow to the heating element 20 is interrupted and the still ceases operation. As a further indicating means that the still has ceased to function, I contemplate the use of a signal means such as is embodied in an electric lamp 33 that is bridged across the main heating circuit. When the heating circuit is interrupted by a tilting of the mercury switch 22, the lamp 33 will be extinguished and will therefore give notice to an operator who may be remote from the still of the condition occurring. It will be observed, however, that the lamp has been so connected in the main circuit that an accidental extinguishment, usually through burning out, will not affect the operation of the still.

While I have shown one set of elements and combinations thereof for effectuating my improved automatic cut-off mechanism, it will be understood that the same is intended for purpose of illustration only and in no wise to restrict my arrangement to the exact form and structure shown, for many changes may be made therein without departing from the spirit of my invention.

I claim:

In an electric distillation apparatus, the combination of a vaporizing casing, an electric heating element therefor, a pair of chambers communicating with said casing and disposed on opposite sides thereof, a condensation tube extending from said casing into one of said chambers, a separate float chamber communicating with the other of said chambers and free of the disturbances and precipitations set up by said element, a float located in said chamber, a mercury switch electrically connected to said element, and means operatively connecting said float and switch, the movement of said float operating to complete and break the circuit through the switch at predetermined times dependent upon the level of the liquid in said chamber.

In testimony whereof, I have subscribed my name.

ALEXANDER M. BERG.